(12) United States Patent
Deetz et al.

(10) Patent No.: US 9,067,195 B2
(45) Date of Patent: Jun. 30, 2015

(54) PROCESS FOR MAKING IMPROVED CHROMATOGRAPHY MEDIA AND METHOD OF USE

(75) Inventors: Martin J. Deetz, North Wales, PA (US); John J. Maikner, Old Zionsville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 341 days.

(21) Appl. No.: 13/191,367

(22) Filed: Jul. 26, 2011

(65) Prior Publication Data

US 2012/0024792 A1 Feb. 2, 2012

Related U.S. Application Data

(60) Provisional application No. 61/368,379, filed on Jul. 28, 2010.

(51) Int. Cl.
| | | |
|---|---|---|
| *B01J 20/32* | (2006.01) | |
| *B01J 20/26* | (2006.01) | |
| *B01J 20/286* | (2006.01) | |
| *B01J 39/26* | (2006.01) | |
| *B01J 41/20* | (2006.01) | |

(52) U.S. Cl.
CPC .............. *B01J 20/3278* (2013.01); *B01J 20/26* (2013.01); *B01J 20/286* (2013.01); *B01J 39/26* (2013.01); *B01J 41/20* (2013.01)

(58) Field of Classification Search
CPC ...... B01J 20/286; B01J 20/3278; B01J 39/26; B01J 41/20; B01J 20/26
USPC ..................... 210/635, 656, 659, 198.2, 502.1
See application file for complete search history.

(56) References Cited

U.S. PATENT DOCUMENTS

| | | | |
|---|---|---|---|
| 5,373,052 A | 12/1994 | Fukuda et al. | |
| 5,453,186 A | 9/1995 | Muller et al. | |
| 5,647,897 A | 7/1997 | Ouki et al. | |
| 5,647,987 A * | 7/1997 | Muller et al. | 210/635 |
| 6,428,707 B1 * | 8/2002 | Berg et al. | 210/661 |
| 6,572,766 B1 * | 6/2003 | Bergstrom et al. | 210/198.2 |
| 6,689,820 B2 | 2/2004 | Muranaka et al. | |
| 6,994,791 B2 * | 2/2006 | Moller et al. | 210/656 |
| 2004/0005904 A1 | 1/2004 | Wolf | |
| 2004/0059040 A1 * | 3/2004 | Moller et al. | 524/493 |
| 2005/0224415 A1 * | 10/2005 | Akiyama et al. | 210/656 |
| 2007/0066761 A1 * | 3/2007 | Deetz et al. | 525/309 |
| 2007/0193954 A1 * | 8/2007 | Busson | 210/656 |

OTHER PUBLICATIONS

Tanco, "Preparation of porous chelating resin containing linear polymer ligand" Reactive & Functional Polymers, vol. 53, p. 91-101, 2002.

* cited by examiner

*Primary Examiner* — Ernest G Therkorn
(74) *Attorney, Agent, or Firm* — Carl P. Hemenway; Tifani Edwards

(57) ABSTRACT

The present invention further is directed to the process for making a macroporous polymeric media with covalently bonded quaternary ammonium polymer chains. The media can be applied for chromatographic purification, resulting in porous substrates having improved protein binding capacity and resin selectivity, as well as methods relating to making and using the same.

6 Claims, No Drawings

PROCESS FOR MAKING IMPROVED CHROMATOGRAPHY MEDIA AND METHOD OF USE

This application claims the benefit of priority under 35 U.S.C. §119(e) of U.S. Provisional Patent Application No. 61/368,379 filed on Jul. 28, 2010.

The present invention is directed to the process for making a porous polymeric media with covalently bonded polymer chains. The media can be applied for chromatographic purification, resulting in porous substrates having improved protein binding capacity, kinetics and selectivity, as well as methods relating to making and using the same.

Therapeutic proteins produced from living organisms play an increasingly important role in modern healthcare. These proteins provide many advantages over traditional pharmaceuticals, including increased specificity and efficacy towards disease targets. Mammalian immune systems use a range of proteins to control and eliminate disease threats. The advent of genetic and protein engineering has allowed the development of many "designed" or recombinant protein therapeutics. These therapeutics can be based on a single protein, chemically modified protein, protein fragment or protein conjugate. Chromatographic separations are extensively utilized in the manufacturing of these biopharmaceuticals. As the industry matures, implementation of novel/advanced technologies and methods to enhance separations will provide biotherapeutic producers the ability to provide these medicines to more patients and at lower cost.

Common chromatography methods used to purify proteins include affinity, bioaffinity, ion exchange, reversed phase, hydrophobic interaction, hydrophilic interaction, size exclusion and mixed mode (resin containing combinations of the aforementioned categories), among others. The application and efficiency of each of those types of chromatography procedures relies on the selectivity of surface-surface interactions between the solute molecules and the stationary phase of the chromatography system (chromatography media), each interacting with the mobile liquid phase. A wide variety of stationary phase chromatography support materials are commercially available.

Often the key to a successful separation of product from impurities relies on the correct combination of stationary phase, base matrix (chemical composition and pore structure) and ligand properties (ligand type, ligand density, ligand distribution, ligand length and material composition), and mobile phase or solution properties (buffer type, pH and conductivity). The specific design of the base matrix and ligand results in a chromatography media which can be characterized by several key attributes including protein binding capacity, selectivity, bed permeability, chemical stability or throughput. Purification methods include predominately binding the product (bind and elute), predominately binding the impurities (flow-through) and combinations of the aforementioned (so called weak partitioning and others). It is critical in the design of these technologies to control the chromatography media properties taught above in order to enable and ensure a robust separation leading to purified protein product.

Protein separations can be accomplished on a variety of porous substrates or base matrices. Common materials for resin or bead structures include polysaccharides (agarose, cellulose), synthetic polymers (polystyrene, polymethacrylate and polyacrylamide) and ceramics (silica, zirconia and controlled pore glass).

Membrane and monolith materials are also commonly used for chromatography, particularly in flow-through applications. Typical membrane compositions include synthetic polymers such as polyvinylidenefluoride, polyethylene, polyethersulfone, nylon, and polysaccharides such as cellulose. Monoliths have been developed from polystyrene, polysaccharides, polymethacrylate and other synthetic polymers, polysaccharides and ceramics. Membrane and monolith chromatography differs from beads in that these materials adsorb proteins in the same "convective pores" which control the membrane and monolith material's permeability. Typical membrane and monolith convective pore sizes range from about 0.6 μm to about 10 μm. Ligand addition to these substrates can be accomplished through a variety of well developed techniques including those outlined in this document.

The use of ligand "extenders" to improve protein binding capacity and modify resin selectivity involves coupling functional polymer chains to a base matrix such as by grafting, which extend away from the base matrix surface. Ligand extenders typically create greater binding capacity because the ligand extenders increase functional group availability where target molecule binding exceeds that of a monolayer adsorption on the surface. One such use of this ligand technology is disclosed in U.S. 2004/0059040. U.S. publication 2004/0059040 discloses an adsorbent material for chromatography comprising a polymer coated onto a support, wherein the polymer backbone is attached to the support by one or more linkages which comprise one or more amide groups U.S. 2004/0059040 further discloses that the polymer is reacted with the support to form the covalent linkage. The method is useful for providing a surface coating on the particle surface whereby the particle surface is protected from interaction with the mobile phase (e.g. to prevent the silica particles from being dissolved by high pH mobile phases). This method allows for the ligands to coat the surface of the particles, including the beads, but does not provide for ligands which extend out into the pores to provide high capacity for biomolecules.

The addition of polymer extenders to porous material surfaces provides improved protein binding capacity, binding kinetics and potential changes in protein selectivity. However, as protein separations become more demanding, it becomes more critical to develop new and more efficient technologies and methods in order to create novel polymeric structures. Accordingly, it would be desirable to develop porous polymeric substrates having improved protein binding capacity and improved or modified protein selectivity of the porous polymeric substrates used in protein separation.

In response to the above needs for new porous polymeric substrates, useful for protein separations, having improved protein binding capacity and resin selectivity, a new method for grafting polymer extenders onto porous polymeric substrates has been developed where the polymeric extender ligand is fabricated with a functional endgroup capable of subsequent reaction with a polymer support.

The present invention relates to methods for immobilizing polymer ligands to a polymeric support by covalent bonds. The methods of the invention are performed to reduce or minimize side reactions that occur during more common radical grafting techniques, thereby improving the stability of the resulting functionalized polymeric media.

The present invention further is directed to the process for making a macroporous polymeric media with covalently bonded polymer ligand chains. The media can be applied for chromatographic purification.

In one aspect the invention provides an adsorbent material for chromatography comprising a polymer ligand immobilized onto a polymeric support, wherein the polymer ligand is attached to the polymer support by one or more linkages which comprise one or more functional groups.

In a second aspect the invention provides a method of preparing an adsorbent material for chromatography comprising immobilizing a polymer ligand onto a polymeric support, wherein the polymeric support is reacted with the polymer ligand comprising a polymer backbone, thereby forming one or more linkages between the polymer backbone and the polymeric support, each linkage comprises one or more functional groups.

In a third aspect the invention provides a method of separating chemical compounds from a mixture comprising contacting the mixture with an adsorbent material for chromatography comprising a polymer ligand immobilized onto a polymeric support, wherein the polymer backbone is attached to the support by one or more linkages which comprise one or more functional groups.

As used herein, the singular forms "a," "an," and "the" include plural referents unless the context clearly dictates otherwise.

As used herein, the terms "polymer ligand" and "polymeric ligand" are synonymous terms as are the terms "polymeric support and polymer support."

As used herein, the terms "preferably," "more preferably," and "most preferably" are not intended to suggest a mode that is deemed to be superior but instead is meant to embody suitable narrower ranges of a broader range or group.

All ranges included in the document herein are inclusive and combinable.

As used herein by porous is meant that the materials adsorb proteins via "diffusive pores" which are typically about 200 Å to 3,000 Å In some embodiments of the process of the present invention for making polymeric resin particles, the ratio of the weight of porogen to the total weight of all subsequent monomer is greater than or equal to 0.1; greater than or equal to 0.25; or greater than or equal to 0.5. In some embodiments of the process of the present invention for making polymeric resin particles, the ratio of the weight of porogen to the total weight of all subsequent monomer is less than or equal to 10; less than or equal to 5; or less than or equal to 2.5.

The polymeric support of the present invention includes any polymeric beads which are suitably prepared by polymerizing a monomer mixture comprising at least one vinyl monomer with at least one reactive group. Suitable examples of reactive groups include groups that are electrophilic or convertible to an electrophile or nucleophilic or convertible to a nucleophile.

The polymeric supports of the present invention may be prepared by suspension, emulsion or dispersion polymerization. Suitable vinyl monomers used to prepare the polymeric support of the present invention include but are not limited to those with a single vinyl group, those with multiple vinyl groups, and mixtures thereof. Some suitable vinyl monomers include, for example, vinyl carboxylates, vinyl urethane monomers, vinyl aromatic monomers, (meth)acrylate esters, substituted (meth)acrylate esters, (meth)acrylamides, and mixtures thereof. One suitable example of a vinyl carboxylase is vinyl acetate. One suitable example of a vinyl urethane monomer is triallyl isocyanurate. Examples of suitable vinyl aromatic monomers include styrene, divinyl benzene, and substituted versions thereof (such as, for example, alpha-methyl styrene). Some suitable substituted (meth)acrylate esters include, for example, esters of polyhydric alcohols with (meth)acrylic acid, such as, for example, glycidyl methacrylate, ethylene glycol dimethacrylate, hydroxy ethyl methacrylate, glycerol dimethacrylate, dimethylaminoethyl methacrylate and mixtures thereof. Some suitable substituted (meth)acrylamides are (3-aminopropyl)methacrylamide hydrochloride and hydroxyethyl methacrylamide.

The polymeric support material can be a particulate material, or, in the form of a piece, a sheet, a rod, tube or a capillary coating. Preferably, the support material is a particulate material, suitably having a volume average particle size of from about 0.5 to about 500 µm, preferably from about 0.7 to about 200 µm, most preferably from about 10 to about 120 µm. The particles are preferably substantially spherical. The particulate material suitably comprises pores. The pore size, pore volume and specific surface area of the particulate support material may vary depending on the type of support material used, the characteristics of the polymer to be linked to the support and the desired separation characteristics when in use. The pore size is suitably from about 20 to about 4000 Å, preferably from about 50 to about 1500 Å. For perfusion pores, the pore size is suitably from about 2000 to about 80000 Å, preferably from about 5000 to about 50000 Å. The pore volume is suitably from about 0.1 to about 4 ml/g, preferably from about 0.3 to about 2 ml/g, most preferably from about 0.5 to about 1.5 ml/g. The specific surface area is suitably from about 1 to about 1000 m$^2$/g, preferably from about 25 to about 700 m$^2$/g. most preferably from about 50 to about 300 m$^2$/g.

At least one reactive group of a polymer ligand is covalently bonded to the polymeric support of the present invention. Suitable reactive groups on the polymer ligand susceptible to reaction with polymeric support of the present invention include but are not limited to electrophiles such as alkyl halides, aryl halides, aldehydes, active esters, activated alcohols, epoxides, carbonates, carbocations and synthetic equivalents and combinations thereof or nucleophilic groups such as alcohols, amines, carbanions and synthetic equivalents, thiols, and carboxylates and combinations thereof or free radical acceptors such as unsaturated double bonds.

Suitable reactive groups present on the polymeric support susceptible to reaction with polymer ligand of the present invention include but are not limited to electrophiles such as alkyl halides, aryl halides, aldehydes, active esters, activated alcohols, epoxides, carbonates, carbocations and synthetic equivalents and combinations thereof or nucleophilic groups such as alcohols, amines, carbanions and synthetic equivalents, thiols, and carboxylates and combinations thereof or free radical acceptors such as unsaturated double bonds.

Examples of polymers comprising the polymeric ligands that can be used herein include, but are not limited to, acrylic, methacrylic, polyacrylamide, polymethacrylamide, polysaccharides and mixtures thereof.

The functional groups on the polymeric ligands that can be used herein include, but are not limited to, ion exchange groups, hydrophobic interaction groups, hydrophilic interaction groups, thiophilic interactions groups, metal affinity groups, affinity groups, bioaffinity groups, and mixed mode groups (combinations of the aforementioned). Examples of suitable functional polymeric ligands that can be used herein include, but are not limited to, strong cation exchange groups, such as sulphopropyl, sulfonic acid; strong anion exchange groups, such as trimethylammonium chloride; weak cation exchange groups, such as carboxylic acid; weak anion exchange groups, such as N,N diethylamino or DEAE; hydrophobic interaction groups, such as phenyl, butyl, propyl, hexyl; and affinity groups, such as Protein A, Protein G, and Protein L and unfunctional monomers or intermediary monomers capable of further transformation into another functional group (e.g. glycidyl methacrylate which is transformed into an ion exchange or affinity ligand) and mixtures thereof.

In one embodiment, the functional polymeric ligand is generated via free radical polymerization of a functional monomer in the presence of a dual-functional chain transfer agent. Chain transfer agents are added to affect the molecular weight of the polymer ligand and to allow for reaction with the polymeric support. The reaction of the dual-functional chain transfer reagent with the monomer during polymerization results in a polymeric ligand terminated with a functional endgroup. Suitable dual-functional chain transfer agents contain both a group which allows for the free radical chain to be transferred and a functional group suitable for reaction of the polymeric ligand with the polymeric support. Suitable chain transfer groups include, for example, halomethanes, disulfides, thiols (also called mercaptans), and metal complexes. Additional suitable chain transfer agents include various other compounds that have at least one readily abstractable hydrogen atom, and mixtures thereof. Suitable reactive groups include but are not limited to electrophiles such as alkyl halides, aryl halides, aldehydes, active esters, activated alcohols, epoxides, carbonates, carbocations and synthetic equivalents and combinations thereof or nucleophilic groups such as alcohols, amines, carbanions and synthetic equivalents, thiols, and carboxylates and combinations thereof or free radical acceptors such as unsaturated double bonds. Chain transfer agents may be added in one or more additions or continuously, linearly or not, over most or all of the entire reaction period or during limited portions of the reaction period. The chain transfer agents can be added to the reaction at levels from 0.01% to 5%, more preferably from 0.1% to 1%.

Crosslinkers, branching agents and nonfunctional monomers may be attached on the polymeric ligand for the purpose of controlling the morphology or interaction of the polymeric ligands. However, these crosslinkers or branching agents on the polymeric ligand are present at low levels, suitable from <5%, more preferably <1%. Suitable crosslinkers or branching agents include but are not limited to monomers, such as ethylene glycol dimethacrylate, divinyl benzene, trimethylpropyl trimethacrylate and methylene bisacrylamide or multifunctional chain transfer agents Examples of "free radical initiators" that can be used herein include, but are not limited to any free radical initiator capable of reacting with vinyl monomers to form polymeric ligands such as peroxides, such as tert-butylhydroperoxide, cumene hydroperoxide; peroxyacetates, such as peracetic acid, chloroperbenzoic acid; persulfates, such as ammonium persulfate, sodium persulfate, potassium peroxodisulfate, azo initiators such as 4,4'-azobis(4-cyanovaleric acid), Irgacure® 2959 (Ciba-Geigy, Hawthorn, N.Y.), 2,2'-azobis(2-amidinopropane)hydrochloride, and the like and mixtures thereof. The grafting to reaction can be initiated with methods know in the art, preferably thermal initiation (heating) or UV irradiation. The free radical initiators can be water soluble or oil soluble. The free radical initiators are added to the reaction at levels from 0.01% to 15%, more preferably from 0.1% to 2%.

The polymer ligand is suitably covalently bonded to the polymeric support. The polymer ligand is suitably added as a solution to a suspension of the polymeric support. The polymeric ligand is then suitably filtered off, washed, and alternately dried by methods known to those of ordinary skill in the art. The temperature during the reaction is suitably from about 25 to about 90° C., preferably from about 50 to about 80° C. In one embodiment, the mixture is kept under inert atmosphere.

The present invention further comprises the use of the adsorbent material for chromatography in chromatographic separation methods. Such chromatographic separation methods can he, for example, ion exchange, hydrophobic interaction, hydrophilic interaction, thiophilic interactions, metal affinity, affinity, bioaffinity, and mixed mode (combinations of the aforementioned), supercritical fluid chromatography (SFC), and simulating moving bed (SMB).

The present invention further comprises the use of the adsorbent material for chromatography in chromatographic separation methods. Such chromatographic separation methods can be, for example, low pressure liquid chromatography, medium pressure liquid chromatography, HPLC, supercritical fluid chromatography (SFC), and simulating moving bed (SMB).

The present invention further comprises a method of separating chemical compounds from a mixture comprising contacting the mixture with the adsorbent material for chromatography according to the present invention.

The primary advantage of the invention is the generation of high capacity ion exchange resin using the pre-fabricated polymer ligand grafting for chromatographic capture and or purification of molecules, and more specifically, biomolecules.

EXAMPLES

The materials contained in the Examples were obtained from the following sources. GE healthcare: Q-Sepharose™ Fisher Scientific: HCl, Tris(hydroxymethyl) aminomethane Sigma-Aldrich: BSA, syringe filter, (3-acrylamidopropyl)trimethylammonium, 2-aminoethanethiol hydrochloride, 2,2'-azobis(2-methylpropionamidine)

Example 1

Preparation of Polymeric Ligand 0.111 g of 2-aminoethanethiol hydrochloride (AET.HCl) and 0.186 g of 2,2'-azobis(2-methylpropionamidine) dihydrochloride (ABMPA.2HCl) were weighed into separate weighing dishes and added to a 250 mL round bottom flask with 38 g of water rinses. 30 g of (3-acrylamidopropyl) trimethylammonium chloride (AAPTMAC) and 32 g of water were weighed directly into the flask. A thermometer and water filled condenser with $N_2$ bubbler were installed connecting with the flask. After the ingredients were placed into the flask, the reaction mixture was stirred at 78° C. for five hours.

Example 2

Generation of Absorbent Material (Reaction of Polymeric Ligand with Polymeric Support)

90 g of the cooled down polymer ligand solution generated in EXAMPLE 1 and 10.6 g of polyGMA-GlyDMA wet cake were added into a round bottom flask. Under $N_2$ atmosphere, the slurry solution was stirred with overhead stirrer (200 rpm) at 65° C. for 16 hours. The resulting cooled down suspension was filtered and washed with water (4×200 mL). The anion exchange resin was stored as an aqueous slurry solution. Albumin from bovine serum (BSA) capacity for the anion exchange resin is 155 mg/mL.

BSA Capacity Test for Absorbent Material
Preparation of Solution 1 (50 mM Tris/HCl, pH 8.61)

12.1 g of Tris(hydroxymethyl) aminomethane was added to a 2 L volumetric flask. Then N/100 HCl solution was applied to fill the flask to 2 liter mark. The contents were shaken after the volumetric flask was capped. Let the solution sit for 5 min and recheck the volume of solution. Add more HCl to adjust the volume to 2 L mark. Check the pH, 8.61. Refrigerate the solution and label (Solution 1)

Preparation of Solution 2 (2 mg/ml BSA solution)

0.806 g of BSA was weighed in a glass jar and added into 403 g of Solution 1. The contents were mixed gently by hand to dissolve. Let the solution sit for 0.5 hour to ensure BSA full dissolution. Label the solution (Solution 2).

1 ml of DI water was slowly added down the side of one Bio-Rad Poly-Prep Chromatography Column to prevent any trapped air. The height of the water was marked with a permanent ink pen. The end-plug was removed from the column. The column was connected to a manifold in a ventilation hood. More DI water was added to the column, and gentle vacuum was applied to the column until water level was 1-2 cm to remain in the bottom of the column to prevent air entrapment The slurry anion exchange resin solution was added into the column. A head of water above the resin was always kept. 1 ml of resin in the column was measured out by slowly addling the diluted resin slurry with a transfer pipette until the packed bed reaches the 1 ml height that was made. Gentle vacuum was applied to remove all but 1-2 cm of solution above the resin. When the resin level fell below the 1 ml mark, more resin slurry was added with additional vacuum. Be careful not to introduce air to the resin bed (stop vacuum before bed is exposed to air). Additional amount of DI water was used as needed to keep the resin bead from being exposed to air. The packed 1 ml resin was rinsed with approximately 10 ml of DI water to displace the slurry solution and the liquid was allowed to drain until the water level is 1-2 cm above the packed bed. Then the packed 1 ml resin were flushed with 10 ml of Solution 1. Vacuum was applied to allow all the Solution 1 to be pulled from the column and allow air to be pulled through the entire column for 1 minute. The disposable column containing the wet cake was removed from the manifold.

The wet cake from the column was transferred to an 8 oz glass jar with a spatula and small amount of the 200 ml of BSA Solution 2 (from the next step). 200 ml of the 2 mg/ml BSA Solution 2 was transferred to the glass jar. Secure the cap on the glass jar. Seal the jar with Parafilm. The glass jar was placed horizontally on a shaker and the sample was gently shaken for 18 h.

After 18 hours, the sample was removed from the shaker and the resin were allowed to settle for 15 minutes. After 15 minutes, open the 8 oz jar and remove 3 mL sample from the jar using a 5 ml syringe. Place 0.22 um filter on to the syringe, and then apply pressure to the syringe and push the BSA solution slowly through the filter into the disposable UV cuvette. The BSA binding capacity was determined from the 278 nm UV absorbance of the filtered supernatant BSA solution after 18 hours incubation.

What is claimed is:

1. A method of preparing an adsorbent material for chromatography comprising immobilizing a polymer ligand onto a polymeric support,
    wherein said polymeric support has reactive groups selected from the group consisting of aldehydes, active esters, activated alcohols, epoxides, carbonates, carbocations, and combinations thereof,
    wherein the polymeric support is reacted with the polymer ligand comprising a polymer backbone, thereby forming one linkage between the polymer backbone and the polymeric support, each linkage comprises one or more functional groups;
    wherein the polymer ligand is prepared by polymerizing a monomer mixture comprising at least one vinyl monomer having one or more functional groups in the presence of a dual-functional chain transfer agent, wherein said chain transfer agent comprises a group which allows for the free radical chain to be transferred and a functional group suitable for reaction of the polymeric ligand with the polymeric support.

2. A method according to claim 1, wherein the groups susceptible to reaction with the polymeric support comprise alcohols, amines, carbanions and synthetic equivalents, thiols, carboxylates, and combinations thereof.

3. A method according to claim 1, wherein the polymeric support has a volume average particle size of from about 0.5 to about 500 μm.

4. A method according to claim 1, wherein the polymer ligand is added as a solution to a suspension of the polymeric support.

5. A method according to claim 1, wherein said polymeric support has reactive groups selected from the group consisting of aldehydes, epoxides, carbonates, and combinations thereof.

6. A method according to claim 1, wherein said polymeric support has reactive groups selected from the group consisting of epoxides.

* * * * *